Dec. 28, 1937.    F. R. LONG    2,103,427
COMBINED PIPE UNION AND BALL CHECK VALVE
Filed Sept. 18, 1935
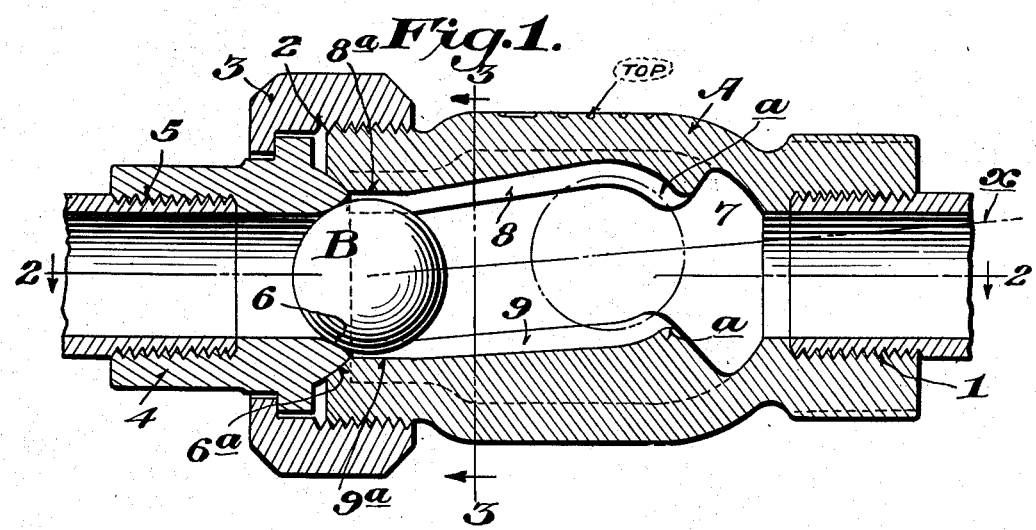
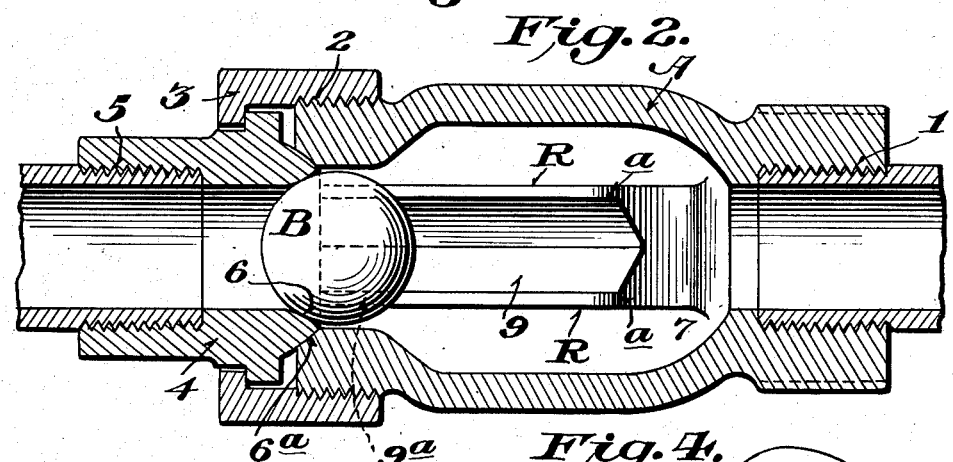
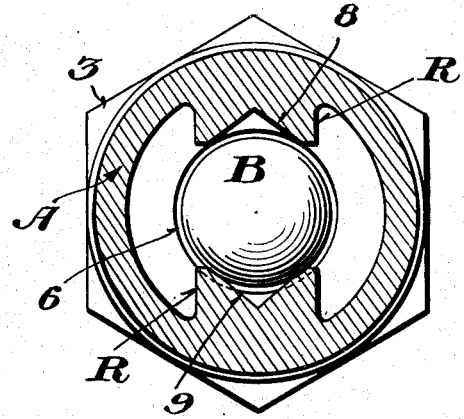
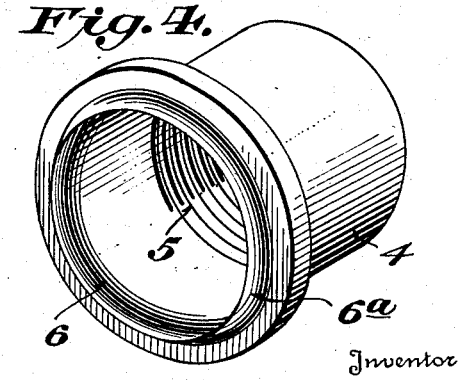
Inventor
Fred R. Long,
By D. P. Wolhaupter
Attorney Patented Dec. 28, 1937

2,103,427

UNITED STATES PATENT OFFICE 2,103,427

COMBINED PIPE UNION AND BALL CHECK VALVE

Fred R. Long, Catawissa, Pa.

Application September 18, 1935, Serial No. 41,146

1 Claim. (Cl. 251—121)

This invention relates to valves and more especially to a combined pipe union and check valve wherein the valve proper is of the self-closing ball type.

One of the objects of the invention is to provide a pipe union and check valve in such a form that one unit serves two purposes, namely that of an automatic check valve and a pipe union, thereby economizing in the space occupied in the pipe line and at the same time reducing the time and expense of installation and consequently reducing the original service cost as well as subsequent maintenance. In that connection, the present device has the advantage of providing a check valve which has no openings other than those communicating directly with the pipe ends and, therefore, is not subject to leakage and, when the ball valve is removed, the device may efficiently function as a pipe union.

One of the particular objects of the invention is to provide a check valve wherein the valve seat is formed on the male member of the union and is held to the chambered member by a coupling nut which not only serves to automatically center the valve seat with reference to the longitudinal axis of the chambered member by the mere act of coupling the two parts together, but also makes it possible to readily inspect the valve seat when necessary by simply removing the coupling nut, or, in the event that a new valve seat is required, it becomes necessary only to replace the male part of the union having a new valve seat.

A further object of the invention is to provide ball guiding elements in the chambered member which for the major portion of their length are oblique to the longitudinal axis of the valve chamber but which also have portions parallel to the axis adjacent the valve seat so that as the ball valve approaches the seat it will be accurately guided into position. In that connection, it is proposed to make the guide means or runways of channel shape, V-shape, or equivalent formation to provide in effect opposite pairs of guiding ribs which prevent the accumulation of scale or sediment that might hamper the functioning of the ball.

With the above and other objects in view which will more readily appear as the nature of the invention is better understood, the same consists in the novel features of construction, combination and arrangement of parts hereinafter more fully described, illustrated in the accompanying drawing, and defined in the appended claim.

A preferred and practical embodiment of the invention is shown in the accompanying drawing, in which:—

Figure 1 is a vertical, longitudinal sectional view of the present invention.

Figure 2 is a horizontal sectional view taken on the line 2—2 of Figure 1.

Figure 3 is a vertical sectional view taken on the line 3—3 of Figure 1.

Figure 4 is a detail perspective view of the valve seat member of the union.

Similar reference characters designate corresponding parts throughout the several figures of the drawing.

According to the embodiment shown in the drawing, the present invention includes in its organization a valve body A internally threaded at one end as indicated at 1 and externally threaded at the opposite end as shown at 2, thereby to receive a coupling ring or nut 3 which engages the externally flanged male member 4 of the union to clamp it to the body A. The member 4 is internally threaded at 5 and formed with a ground valve seat 6 which is exposed in one end of the valve chamber 7 when the parts are assembled as shown in Figures 1 and 2. The exterior surface 6ᵃ of the valve seat 6 is ball-faced or rounded to conform to the shape of the end of the chamber 7 so that when the coupling ring or nut 3 is turned, the valve seat 6 will be placed precisely co-axial with the longitudinal axis of the said valve chamber.

The interior of the valve chamber is provided with the upper and lower runways 8 and 9, respectively. For the major part of their length, these runways are inclined obliquely to the longitudinal axis of the union indicated by the line 2—2, the angular axis of said major portion of the runways being indicated by the line $x$. The ends of the runways adjacent the valve seat are parallel to line 2—2 as indicated at 8ᵃ and 9ᵃ respectively so that the ball B is accurately guided toward the seat 6 when moving to its closed position. The ends of the runways opposite the portions 8ᵃ and 9ᵃ are contracted as indicated at $a$ to prevent the ball from leaving the runways and seating at the mouth of the opening in the body A having the internal threads 1.

In order to insure proper installation of the valve when used horizontally so that the runways will be inclined downwardly, it is customary practice to mark the proper side of the valve with the external indicia "Top". Of course, when the valve is used in a vertical position, the ball B tends to rest on the seat 6 by gravity, the installation being made with the internally threaded end 1 located in the top and the valve seat member at the bottom.

In connection with the runways 8 and 9, it is pointed out that the same are formed in offset relation to the interior of the valve chamber 7 so as not to obstruct flow, and, as shown in Figure 3, are preferably of channeled or grooved formation. Although the channel in the illustration is shown as partaking of a V-shape, nevertheless, it will be understood that this cross-sectional shape may be varied since the essential purpose of this general construction is to provide spaced ribs R which provide in effect a track or guideway which holds the major portion of the ball away from the bottom of the channel or groove. With this arrangement, the valve becomes self-cleaning or self-clearing in the respect that flow through the line will automatically remove particles of scale, rust or other foreign matter from the runways and thus insure proper functioning of the ball B under all conditions of use. The arrangement and location of the runways 8 and 9 is such that flow is not impeded through the device, and moreover, the arrangement of inclined and straight portions in the runway not only insures full and accurate seating of the ball but also renders the valve particularly effective at low pressures since the ball has little or no resistance to unseating while travelling on the straight portions 8a and 9a.

From the foregoing it will be apparent that the distinctive features of the present invention are the self-centering valve seat operating in conjunction with the centering guides in the end of the inclined runways. Furthermore, the runways themselves are of novel construction so as to insure reliable functioning of the valve at all times.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:—

A check valve comprising a valve body having a horizontally disposed valve chamber, means providing a valve seat at one end of said chamber, a ball valve within said chamber for cooperation with said valve seat, and opposite pairs of ribs offset from the inner face of the valve chamber to provide runways for said ball, said ribs terminating short of the end of the valve chamber opposite the valve seat in inwardly directed enlargements to limit movement of the ball away from said seat, and the portions of said ribs adjacent to said valve seat being disposed parallel to the axis of said seat so that when the ball is disposed on said latter portions it is freely rollable into and from engagement with the valve seat, and the remaining portions of said ribs being inclined relative to said first mentioned portions so that whenever the ball is disposed on said inclined portions it tends to roll onto said first mentioned portions.

FRED R. LONG.